(12) United States Patent
Lee

(10) Patent No.: US 10,642,578 B2
(45) Date of Patent: *May 5, 2020

(54) APPROXIMATING FUNCTIONS

(71) Applicant: Imagination Technologies Limited, Kings Langley (GB)

(72) Inventor: Tim Lee, Kings Langley (GB)

(73) Assignee: Imagination Technologies Limited, Kings Langley (GB)

( * ) Notice: Subject to any disclaimer, the term of this patent is extended or adjusted under 35 U.S.C. 154(b) by 0 days.

This patent is subject to a terminal disclaimer.

(21) Appl. No.: 16/520,108

(22) Filed: Jul. 23, 2019

(65) Prior Publication Data

US 2019/0347073 A1 Nov. 14, 2019

Related U.S. Application Data

(63) Continuation of application No. 16/351,159, filed on Mar. 12, 2019, now Pat. No. 10,402,167, which is a
(Continued)

(30) Foreign Application Priority Data

May 1, 2014 (GB) .................................. 1407688.9

(51) Int. Cl.
*G06F 1/02* (2006.01)
*G06F 7/523* (2006.01)
(Continued)

(52) U.S. Cl.
CPC .............. *G06F 7/523* (2013.01); *G06F 7/544* (2013.01); *G06F 17/17* (2013.01)

(58) Field of Classification Search
None
See application file for complete search history.

(56) References Cited

U.S. PATENT DOCUMENTS 4,482,975 A 11/1984 King et al.
4,583,188 A 4/1986 Cann et al.
(Continued)

FOREIGN PATENT DOCUMENTS

CN 102955682 A 3/2013
CN 103268217 A 8/2013
(Continued)

OTHER PUBLICATIONS

Sheikh et al: "A 2.05 GVertices/s 151 mW Lighting Accelerator for 3D Graphics Vertex and Pixel Shading in 32 nm CMOS", IEEE Journal of Solid-State Circuits, IEEE Service Center, Piscataway, NJ, USA, vol. 48, No. 1, Jan. 2013 (Jan. 2013), pp. 128-139.
(Continued)

*Primary Examiner* — David H Malzahn
(74) *Attorney, Agent, or Firm* — Potomac Law Group, PLLC; Vincent M DeLuca

(57) ABSTRACT

A binary logic circuit for approximating a mathematical function over a predefined range as a series of linear segments, each linear segment having one of a predetermined set of fixed gradients and a corresponding base value, the binary logic circuit comprising: an input for receiving an input variable in the predefined range; a plurality of logic chains each comprising: a binary multiplier adapted to perform multiplication by a respective one of the set of fixed gradients using h−1 binary adders, where h is the extended Hamming weight; and a binary adder adapted to add a base value to the input or output of the binary multiplier; and selection logic configured to select one of the logic chains in dependence on the input variable so as to provide, for the received input variable, an approximate value of the mathematical function.

20 Claims, 3 Drawing Sheets

Related U.S. Application Data continuation of application No. 15/696,385, filed on Sep. 6, 2017, now Pat. No. 10,268,450, which is a continuation of application No. 14/701,818, filed on May 1, 2015, now Pat. No. 9,785,406.

(51) Int. Cl.
   *G06F 7/544* (2006.01)
   *G06F 17/17* (2006.01)

(56) References Cited

U.S. PATENT DOCUMENTS

| | | | |
|---|---|---|---|
| 5,824,936 | A | 10/1998 | DuPuis et al. |
| 6,163,791 | A | 12/2000 | Schmookler et al. |
| 6,657,573 | B2 | 12/2003 | Langlois et al. |
| 7,580,964 | B2 | 8/2009 | Merlo et al. |
| 8,856,201 | B1 | 10/2014 | Langhammer et al. |
| 9,785,406 | B2* | 10/2017 | Lee .......... G06F 7/544 |
| 10,268,450 | B2* | 4/2019 | Lee .......... G06F 7/544 |
| 10,402,167 | B2* | 9/2019 | Lee .......... G06F 7/544 |
| 2007/0094318 | A1 | 4/2007 | Lutkemeyer |
| 2007/0282936 | A1 | 12/2007 | Tandon et al. |
| 2011/0270902 | A1 | 11/2011 | Dimitrov et al. |
| 2015/0317126 | A1 | 11/2015 | Lee |
| 2017/0364329 | A1 | 12/2017 | Lee |
| 2019/0347073 | A1* | 11/2019 | Lee .......... G06F 17/17 |

FOREIGN PATENT DOCUMENTS

| | | |
|---|---|---|
| EP | 0606775 A1 | 7/1994 |
| EP | 2645199 A1 | 10/2013 |
| GB | 2185606 A | 7/1987 |

OTHER PUBLICATIONS

"Balanced Ternary", Wikipedia, Feb. 16, 2014 (Feb. 16, 2014), pp. 1-13, XP055225401, Retrieved from the Internet: URL:https://en.wikipedia.org/w/index.php?title=Balanced_ternary&oldid=595677706.

"Ternary numeral system", Wikipedia, Mar. 18, 2014 (Mar. 18, 2014), pp. 1-6, XP055225399, Retrieved from the Internet: URL:https://en.wikipedia.org/w/index.php?title=Ternary_numeral_system&oldid=600142208.

Behrooz et al: "Arithmetic with binary-encoded balanced ternary numbers", 2013 Asilomar Conference on Signals, Systems and Computers, IEEE, Nov. 3, 2013 (Nov. 3, 2013), pp. 1130-1133.

Paul et al. "A Fast Hardware Approach for Approximate, Efficient Logarithm and Antilogarithm Computations", IEEE Transactions on Very Large Scale Integration (VLSI) Systems, vol. 17, No. 2, Feb. 2009, pp. 269-277.

* cited by examiner

APPROXIMATING FUNCTIONS

BACKGROUND OF THE INVENTION

This invention relates to a binary logic circuit for approximating a mathematical curve over a predefined range as a series of linear segments, and a method of deriving a hardware representation of such a binary logic circuit.

It is often desirable to perform certain functions at high speed in hardware. For example, integrated circuits for performing computer graphics processing and digital signal processing can frequently need to calculate the value of a log or gamma function for a given input value. Hardware for performing such calculations will typically operate over a defined range of input values and will typically be required to calculate the function to a certain level of accuracy. This allows hardware designers to use an approximation to a given function so as to provide a low latency solution which does not consume an inordinate amount of area on an integrated circuit.

The $\log_2$ function is one such function which is often implemented in silicon and, conventionally, has often been approximated over the interval [1, 2] by a straight line. This is the so-called Mitchell approximation 102 illustrated in FIG. 1. While it provides a fast approximation when implemented in hardware, it can be seen that the Mitchell approximation differs from the curve of the $\log_2$ function 101 in particular near the middle of the interval [1,2].

The poor accuracy of the Mitchell approximation has led to the development of look-up table based approaches, such as is described in U.S. Pat. No. 4,583,180. These approaches replace the calculation of an approximation function (such as the straight line of Mitchell) with a look-up into a large table of pre-calculated values for the function itself. Such an approach is accurate but the memory requirements for the look-up table consume a large area of integrated circuit and can be relatively slow.

Further refinements of the look-up table approach have been developed which use interpolation between values in a smaller look-up table to provide a similar degree of accuracy whilst reducing the size of the table. One recent approach of this variety has been proposed by Paul et al. in their paper "A fast hardware approach for approximate, efficient logarithm and antilogarithm computations", IEEE Transactions on VLSI Systems, Vol. 17, No. 2, February 2009. However, this approach requires the use of a multiplication array in hardware which is adapted to perform multiplication of two variables. Such a construct is complex and consumes a large area on an integrated circuit.

BRIEF SUMMARY OF THE INVENTION

According to a first aspect of the present invention there is provided a binary logic circuit for approximating a mathematical function over a predefined range as a series of linear segments, each linear segment having one of a predetermined set of fixed gradients and a corresponding base value, the binary logic circuit comprising:
  an input for receiving an input variable in the predefined range;
  a plurality of logic chains each comprising:
    a binary multiplier adapted to perform multiplication by a respective one of the set of fixed gradients using h−1 binary adders, where h is the minimum Hamming weight of:
      a binary representation of the fixed gradient;
      a trinary representation of the fixed gradient; and
      a representation of the fixed gradient as a product of two binary numbers, two trinary numbers, or a binary and a trinary number;
    the h−1 binary adders being logically configured to perform the multiplication using the representation of the fixed gradient having that minimum Hamming weight h; and
    a binary adder adapted to add a base value to the input or output of the binary multiplier; and
  selection logic configured to select one of the logic chains in dependence on the input variable so as to provide, for the received input variable, an approximate value of the mathematical function.

Each of the fixed gradients in the predetermined set of fixed gradients may have a minimum Hamming weight, h, which is less than or equal to a threshold value, wherein the threshold value determines a limit on the number of adders that the binary multiplier is adapted to use for performing a multiplication.

The threshold value may be 2 or 3.

The minimum Hamming weight h may be less than or equal to 3.

The selection logic may be configured to select one of the logic chains by comparing the received input variable to a predetermined set of break values, each break value representing a value of the input variable delimiting one or more linear segments.

The selection logic may be configured to determine a pair of adjacent break values between which the received input variable lies and, responsive to that determination, select the logic chain corresponding to the linear segment lying between that pair of adjacent break values.

Each of the set of break values may be used in the selection logic in the form of:
  a binary representation of the break value;
  a trinary representation of the break value; or
  a representation of the break value as a product of two binary numbers, two trinary numbers, or a binary and a trinary number;
the form used for each break value being the representation of that break value having the minimum Hamming weight.

The minimum Hamming weight of each of the set of break values may be less than or equal to 3.

The mathematical function may be expressed in the form $y=f(x)$, where x and y represent values along respective Cartesian axes.

The binary adder of each logic chain may be arranged to add the respective base value to the output of the binary multiplier.

Each linear segment may represent part of a line that crosses the y axis at the base value.

The binary adder of each logic chain may be arranged to add the respective base value to the received input variable.

Each linear segment may represent part of a line that crosses the x axis at the base value.

The plurality of binary multipliers may comprise at least three binary multipliers.

The mathematical function may be a continuous smooth function over the predefined range.

The mathematical function may be a base 2 logarithm and the predefined range can be between 1 and 2.

The mathematical function may be a gamma function and the predefined range can be between 0 and 1.

The at least one of the plurality of logic chains may comprise a binary multiplier adapted to perform multiplication by a fixed gradient having a minimum hamming weight of greater than one.

Machine readable code may be provided for generating the binary logic circuit. A machine readable storage medium having encoded thereon non-transitory machine readable code may be provided for generating the binary logic circuit.

According to a second aspect of the present invention there is provided a method of deriving a hardware representation of a binary logic circuit configured to approximate a mathematical function over a predefined range as a series of linear segments, the method comprising:
fitting a plurality of linear segments to the function over the predefined range, each segment extending between a pair of break points and having a fixed gradient selected from a predetermined set of fixed gradients,
determining a base value for each of the segments; and
deriving a hardware representation for a binary logic circuit which comprises:
for each of the plurality of linear segments:
a binary multiplier adapted to perform multiplication by the selected fixed gradient of the segment using h−1 binary adders, where h is the minimum Hamming weight of:
a binary representation of the fixed gradient;
a trinary representation of the fixed gradient; and
a representation of the fixed gradient as a product of two binary numbers, two trinary numbers, or a binary and a trinary number;
wherein the h−1 binary adders are logically configured to perform multiplication using the representation of the fixed gradient having the minimum Hamming weight h; and
a binary adder adapted to add the determined base value to the input or output of the binary multiplier;
and
selection logic adapted to select, for a given input variable in the predefined range, one of the plurality of binary multipliers in dependence on the determined break points.

Each of the fixed gradients in the predetermined set of fixed gradients may have a minimum Hamming weight, h, which is less than or equal to a threshold value, wherein the threshold value determines a limit on the number of adders that the binary multiplier is adapted to use for performing a multiplication.

The threshold value may be 2 or 3.

The minimum Hamming weight h may be less than or equal to 3.

The method may further comprise:
for each of the plurality of linear segments, calculating an average gradient between the break points delineating that linear segment; and
selecting the closest fixed gradient to the calculated average gradient from the predetermined set of fixed gradients, the set of fixed gradients comprising gradients which are represented as binary representations, trinary representations and representations being the product of two binary numbers, two trinary numbers, or a binary and a trinary number.

The method may further comprise selecting a sufficient number of the plurality of linear segments such that the binary logic circuit achieves at least a predetermined accuracy substantially over the predefined range of values for the input variable.

The hardware representation may be RTL, a hardware description language, or a gate-level description language.

The hardware description language may be Verilog or VDHL.

The gate-level description language may be OASIS or GDSII.

Machine readable code may be provided for implementing the method of deriving a hardware representation of a binary logic circuit. A machine readable storage medium having encoded thereon non-transitory machine readable code may be provided for implementing the method of deriving a hardware representation of a binary logic circuit.

A data processing device is provided for generating a hardware representation according to the above-described method.

A method of manufacturing a binary logic circuit in accordance with a hardware representation derived using the above-described method is also provided.

BRIEF DESCRIPTION OF THE DRAWINGS

The present invention will now be described by way of example with reference to the accompanying drawings. In the drawings.

DETAILED DESCRIPTION

The following description is presented by way of example to enable any person skilled in the art to make and use the invention. The present invention is not limited to the embodiments described herein and various modifications to the disclosed embodiments will be readily apparent to those skilled in the art.

It would be useful to have binary logic capable of calculating a mathematical function at high speed to a desired level of precision and which makes more efficient use of integrated circuit area.

A binary logic circuit is provided for calculating an estimate of a function over a predefined range. The logic described herein is suitable for approximating a wide variety of functions, including but not limited to log or gamma functions.

Figure 1:
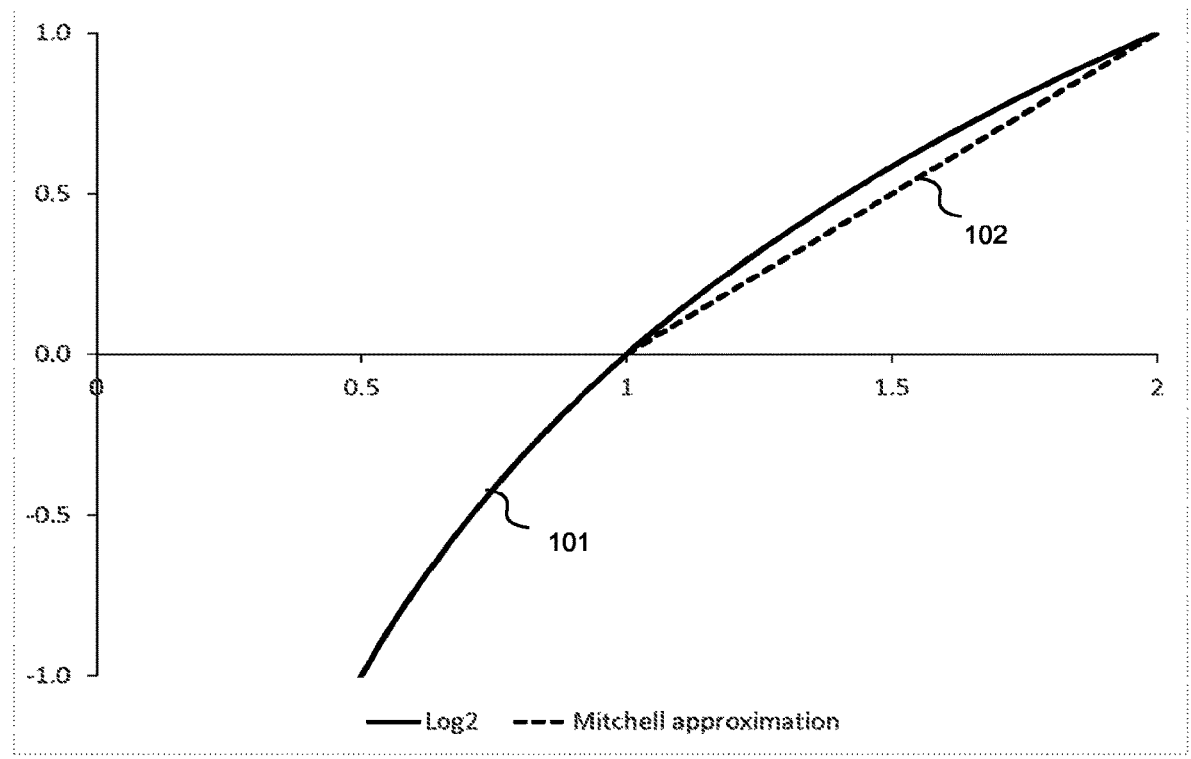
FIG. 1 is a plot illustrating the Mitchell approximation over the interval [1, 2] of the function $\log_2(x)$.
Figure 2:
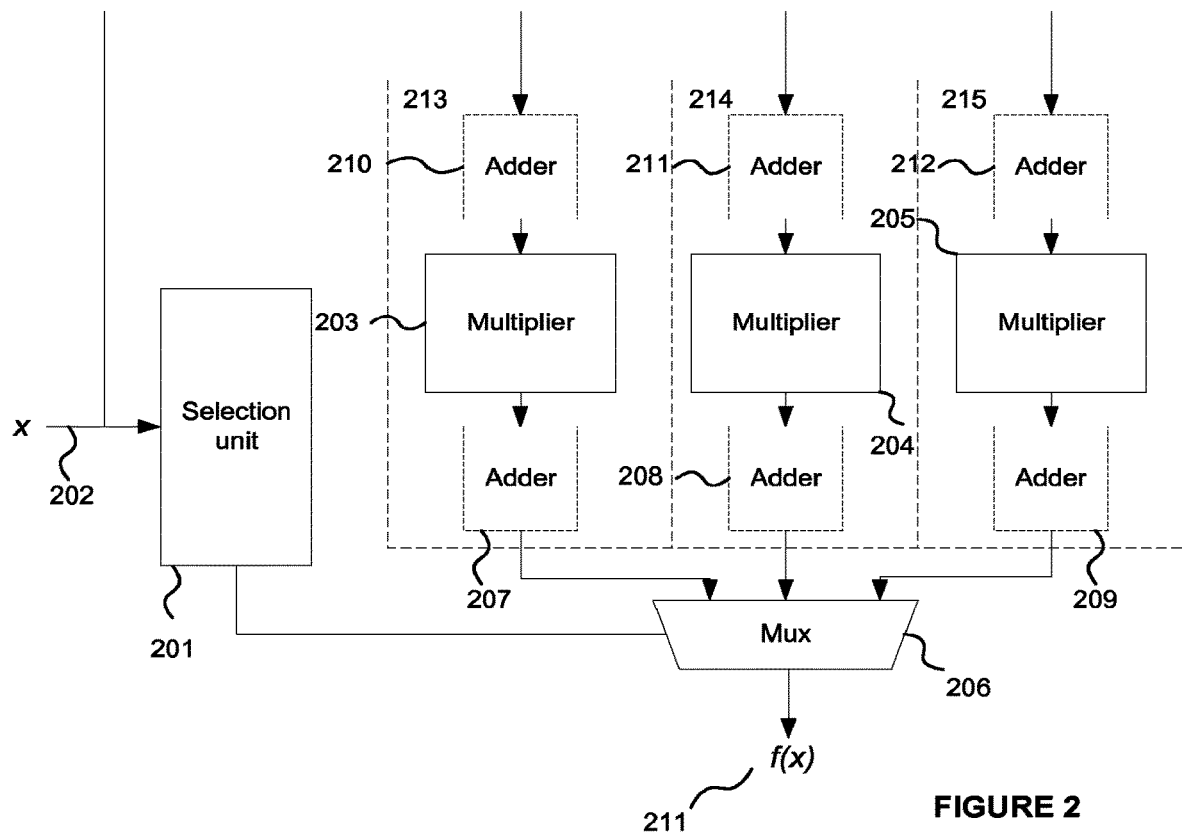
FIG. 2 is a schematic diagram of a binary logic circuit for calculating an approximation of a function according to one aspect of the invention.

FIG. 2 shows a binary logic circuit configured to approximate a mathematical function f(x) as a series of straight line segments over a given range of input values of x 202. The logic circuit comprises a logic arrangement which, in the example shown, includes three logic chains 213-215, each corresponding to one of the line segments employed in the approximation. At its output 211, the logic circuit provides an approximate value for the function f(x).

Figure 3:
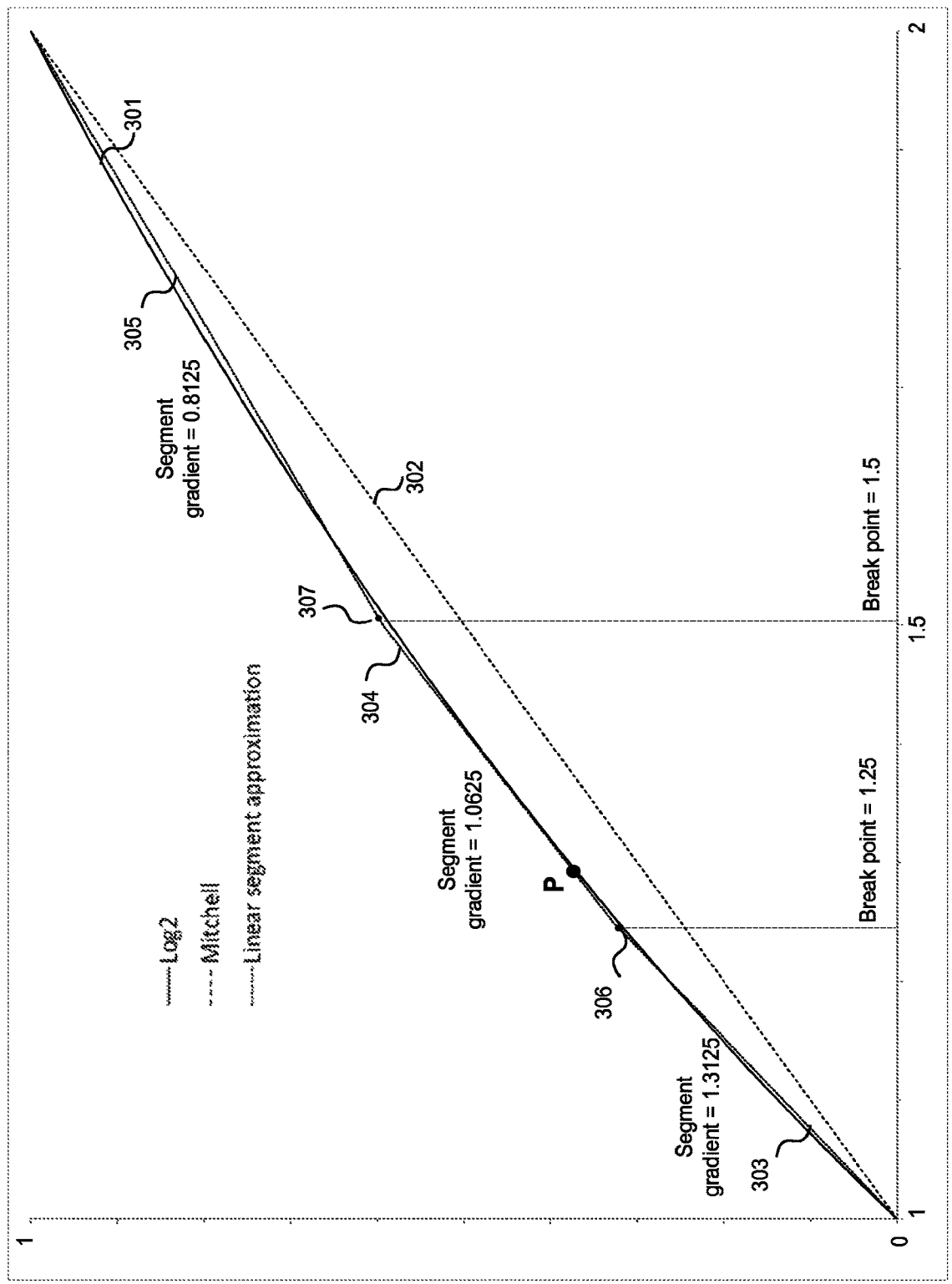
FIG. 3 is a plot illustrating the approximation to the function $\log_2(x)$ by a binary logic circuit using a series of linear segments in accordance with the invention.

An example of an approximation which the binary logic circuit of FIG. 2 could be configured to perform is shown in FIG. 3. In this example the function f(x) 301 is the function $\log_2(x)$ over the range $x \in [1, 2]$ but more generally the function could be any function which can be approximated by a series of line segments of finite gradient. The approximation shown in FIG. 3 comprises three line segments 303, 304 and 305. The gradient, start and end points of each line segment are chosen such that the line segments approximate the curve of the function. It can be seen that the line segments (303, 304 and 305) follow the curve of the function more closely than the conventional Mitchell approximation 302. Since the function $\log_2(x)$ is a continuous function, the line segments are arranged end-to-end in the form of a chain. For discontinuous functions this would not be the case, with the chain of line segments being interrupted across the discontinuity so as to better approximate the function at hand.

In the example shown in FIG. 3, the $\log_2(x)$ curve for x between 1 and 2 is approximated by three line segments chosen to have the gradients shown in the following table:

TABLE 1

| Segment | Gradient | Binary gradient | Hamming weight | Intersection |
|---|---|---|---|---|
| 303 | 1.3125 | 1.0101 | 3 | −1.3125 |
| 304 | 1.0625 | 1.0001 | 2 | −1 |
| 305 | 0.8125 | 0.1101 | 3 | −0.625 |

These gradients are advantageous because the binary integer expression of each gradient has a low Hamming weight of either 2 or 3. The simplicity of the gradients shown in the above table when expressed in binary can be appreciated by rewriting each gradient as a combination of powers of two:

$$1.3125 = 1 + \tfrac{1}{4} + \tfrac{1}{16}$$

$$1.0625 = 1 + \tfrac{1}{16}$$

$$0.8125 = \tfrac{1}{2} + \tfrac{1}{4} + \tfrac{1}{16} = 1 - \tfrac{1}{8} - \tfrac{1}{16}$$

Note that it is the number of terms of a binary value which are a 1 (rather than a 0) which is significant to the complexity of a hardware implementation of a multiplication operation in which that binary value is an operand. An exponent of a binary value can be expressed as a left/right shift of the terms by an appropriate number of binary significand places, which can be achieved through the use of appropriate connections in hardware. No logic is required to perform such a left/right shift.

Although the gradient, start and end points of each line segment could in principle be freely chosen when approximating a function with a series of line segments, selecting particular fixed values for the gradient of the line segments at design time can provide significant benefits when implementing the binary logic shown in FIG. 2 in hardware. The gradient of each of the segments 303, 304 and 305 is selected to be a binary value having a low extended Hamming weight. The extended Hamming weight of a binary number is the minimum number of non-zero symbols present in the following representations of the binary number: (a) its standard binary representation, (b) its trinary representation (e.g. a canonical bit representation in which the digits can be 0, +1 or −1), or (c) its representation as a multiplication of two binary or trinary numbers.

A hardware implementation of a multiplication operation using an operand of extended Hamming weight n requires n−1 adder/subtractor units. The multiplication by the product of two binary or trinary numbers having extended Hamming weights m and n thus requires m−1+n−1 adders/subtractor units, and is equivalent to multiplication by an operand of extended Hamming weight m+n−1.

Examples illustrating the extended Hamming weight of binary numbers include:

The binary number 1.0001 has a Hamming weight of 2 and this is also its extended Hamming weight since the standard binary representation comprises the minimum number of non-zero symbols of the representation types (a)-(c).

The binary number 0.1111 has a Hamming weight of 4 but can be expressed more efficiently in trinary form as 1.000$\bar{1}$ (i.e. 1−0.0001) which has a Hamming weight of 2. The extended Hamming weight of the binary number 0.1111 is therefore 2.

The binary number 1101001 has a Hamming weight of 4 but can be expressed more efficiently as a product of two trinary numbers each having a Hamming weight of 2 as 100$\bar{1}$×100$\bar{1}$; the extended Hamming weight of the binary number 1101001 is therefore 3.

Multiplication by a binary or trinary number having an extended Hamming weight of 2 can be logically implemented using a single adder/subtractor, and multiplication by a binary or trinary number having an extended Hamming weight of 3 can be logically implemented using two adders/subtractors. Multiplication by two binary or trinary numbers having extended Hamming weights of 2 can also be implemented using two adders/subtractors, hence consuming the same area of silicon as multiplication by a binary or trinary number having an extended Hamming weight of 3.

Selecting the gradient of each of the segments 303, 304 and 305 to be a binary value having a low extended Hamming weight ensures that multiplication operations by the fixed gradients can be efficiently implemented in hardware whilst still providing a good approximation to the subject function. Multiplication by a fixed gradient with an extended Hamming weight of h can be implemented by a multiplication array having h−1 rows, each representing an addition operation where the operand is shifted by an appropriate number of places. For low extended Hamming weights, such a binary multiplication array provides a compact implementation which consumes only a small area of integrated circuit and offers high performance.

Multipliers 203-205 in FIG. 2 are configured to logically perform the multiplication operation using the representation of the fixed gradient (chosen from (a) to (c) above) which has the lowest Hamming weight and hence determines the extended Hamming weight of that binary fixed gradient value. For example, if the fixed gradient for a line segment is the binary value 1101001, multiplication by that fixed gradient in hardware would be performed using the lowest Hamming weight form of the fixed gradient, which is 100$\bar{1}$×100$\bar{1}$ and defines the extended Hamming weight as being 2 for this fixed gradient (hence, in this example the multiplier logic would comprise two multipliers in sequence, each configured to perform multiplication by a trinary number having a Hamming weight of 2).

It has been found that an efficient approximation can be provided in hardware for a wide range of functions using line segments having fixed gradients with extended Hamming weights of less than or equal to 3. In other examples, the fixed gradients of the line segments of an approximation configured according to the principles taught herein can have extended Hamming weights of less than or equal to 2. Generally speaking, the lower the extended Hamming weight of a gradient, the more efficient a given multiplication array implementing multiplication by that gradient. The number of line segments can be balanced against the extended Hamming weight of each segment at design time in order to minimise the complexity of the hardware. Generally speaking, the accuracy of a given approximation can be improved by using a larger number of segments, each having a gradient selected from a set of gradients which are known to have low extended Hamming weights. This may be preferable to using line segments which more accurately match the function but whose gradients have larger extended Hamming weights. This is because the resulting hardware approximation may offer a better balance between accuracy and the demands of the hardware in terms of speed and the area of integrated circuit consumed. The demands on the hardware are particularly high when the integrated circuit is to be included in a mobile device because silicon area and power consumption may be very limited.

In FIG. 2, each of the multiplier arrays 203, 204 and 205 corresponds to one of the line segments 303, 304 and 305 shown in FIG. 3, with each multiplier array being configured to operate over input values within a predetermined range corresponding to the extent of the respective line segment. The multiplier arrays may be referred to herein simply as "multipliers". Multiplier 203 operates over the range of line segment 303 in FIG. 3 (from 1 to 1.25), multiplier 204 operates over the range of line segment 304 (from 1.25 to 1.5), and multiplier 205 operates over the range of line segment 305 (from 1.5 to 2).

Each of the line segments shown in FIG. 3 forms part of a line which can be expressed in the form y=mx+c, where y is the estimated value of f(x), m is the fixed gradient of the line, and c is the intersection point of the line segment with the y axis were the line segment extended to meet y-axis. A given line segment can therefore be defined by four parameters: its gradient m, its intersection c, and the values of x defining its start and end points (in FIG. 3 the values 1, 1.25, 1.5 and 2 bound the three line segments).

An estimate of the function f(x) can be calculated by calculating "mx+c" for a given value of x using the fixed gradient and intersection values of the line segment corresponding to the input value x. Thus, in order to calculate an approximation to the function $\log_2(x)$ for a given value of x, first the value of x is compared to the break points (1, 1.25, 1.5 and 2) to determine which line segment is relevant for the input value, x. Then the output of the corresponding multiplier in FIG. 2, which is configured to multiply the input value x 202 by the fixed gradient m of the respective line segment, is selected for use in the output 211 of the logic circuit. Adders provided in the logic chains 213-215 can be used to perform the addition of the intersection parameter c. The arrangement of logic provided in FIG. 2 for performing this calculation will now be described.

On receiving an input value x 202 lying in the defined range between 1 and 2, the selection unit 201 identifies which of the multipliers 203-205 provides the appropriate calculation for the approximation. This can be achieved by comparing the input value x to the stored boundary values of the line segments so as to identify which of the line segments forms the approximation to the curve f(x) at the given value of x. For example, looking at FIG. 3, consider calculating an approximation to f(x) at point P on the curve having an x a value of 1.3. This value lies in the range of the second line segment between break points 1.25 and 1.5 and the output of the second multiplier 204 in this example therefore provides the relevant calculation.

Typically, each of the line segments will belong to a line which does not pass through the origin—i.e. has a non-zero intersection value c. This can be accommodated through the use of adders 210-212 preceding the multiplier arrays or through the use of adders 207-209 following the multiplier arrays that shift the inputs or outputs of the multiplier arrays by a set of base values, as shown in FIG. 2. Adders are shown in FIG. 2 both preceding and following the multiplier arrays, but in some examples there may be adders preceding, but not following, the multiplier arrays, and in some other examples there may be adders following, but not preceding, the multiplier arrays. Each adder following a multiplier can be configured to add the fixed intersection parameter c for the respective line segment. For example, for the second line segment shown in FIG. 3, adder 208 could subtract a fixed base value of 1, which is the intersection value for that line segment given in table 1 above. Each adder preceding a multiplier can be configured to add a base value to x prior to performing multiplication so as to achieve the same result. This can be appreciated by rewriting the general expression for a line as follows:

$$y = mx + c$$
$$= m\left(x + \frac{c}{m}\right)$$

Thus, to continue the example relating to the line segment 304, configuring adder 211 prior to multiplier 204 to add the value $-1/1.0625=-0.941176$ to input value x prior to its multiplication by the fixed gradient m would achieve the same result as employing adder 208 after the multiplier. It will be appreciated that other arrangements are possible to achieve the same result, including making use of adders both before and after a multiplier so as to modify x prior to its multiplication by a fixed gradient and to add a value to the result of that multiplication in order to provide a final output 211.

In practice, the logic shown in FIG. 2 would typically be implemented such that, along with the selection unit 201, each of the logic chains 213-215 performs its calculations on an input value x. The selection unit 201 can in such an arrangement be configured to control a multiplexer 206 so as to select only the output from the selected logic chain for provision as the approximate value of f(x) 211. The selection unit and multiplexer together represent selection logic for selecting the appropriate output value for use as the approximation to the function. As will be apparent to a person skilled in the art of binary logic circuit design, other arrangements are possible.

As FIG. 3 shows, a close approximation to the function $\log_2(x)$ can be achieved when the gradients of the set of line segments 303-305 are restricted to binary values having low extended Hamming weights. The values of break points 306 and 307 at which adjacent line segments meet are of lesser importance and can be selected so as to allow the segments to most closely match the function. However, where possible it is advantageous if the values of the break points are also chosen to be binary values having low extended Hamming weights. This can reduce the complexity of the logic at selection unit 201 used to determine which of the multipliers to use for a given input value x. In FIG. 3, the break points 306 and 307 have the values 1.25 and 1.5 respectively, which correspond to the binary values 1.01 and 1.1.

In designing binary logic circuits according to the principles described herein, line segments having fixed gradients of low extended Hamming weights are constructed so as to approximate the function at hand. As many line segments are used as are required to meet the desired level of accuracy of the approximation. It is however advantageous to use a greater number of shorter line segments in regions where the gradient of the function changes quickly, than in regions where the gradient of the function changes slowly. This leads to an uneven distribution of break points. For instance, in the example shown in FIG. 3 the two break points occur in the first half of the range of x where the gradient of the $\log_2(x)$ function is changing most quickly.

As is known in the art, it is sometimes possible to implement hardware using a trinary or canonical bit representation of a binary number so as to provide a value having a lower Hamming weight for use in binary operations. For example, the binary number 0.1111, which has a Hamming weight of 4, can be represented in its canonical form as 1.000$\bar{1}$, which expresses the binary value of 1-0.0001, and corresponds to a decimal value of 0.9375. This canonical form has a Hamming weight of 2 and hence the binary number 0.1111 can be said to have an extended Hamming weight of 2.

Binary logic configured in accordance with the principles described herein can employ trinary or canonical bit representations in order to simplify a given hardware implementation. As appropriate, segment gradients can therefore be expressed in hardware in their canonical form. Where the canonical form of a segment gradient is used, the extended Hamming weight of the segment gradient is the Hamming weight of the segment gradient in its canonical form.

Note that binary logic configured in accordance with the principles set out herein makes use of fixed multiplication operations which can be efficiently implemented in hardware. No slope input is required to the multiplier arrays since each gradient multiplication factor is fixed by the architecture of each array. Furthermore, a lookup table is not required in order to calculate an approximation of a function. Binary logic configured in accordance with the principles described herein offers a high speed solution for approximating a function in hardware without consuming large areas of integrated circuit.

Figure 4:
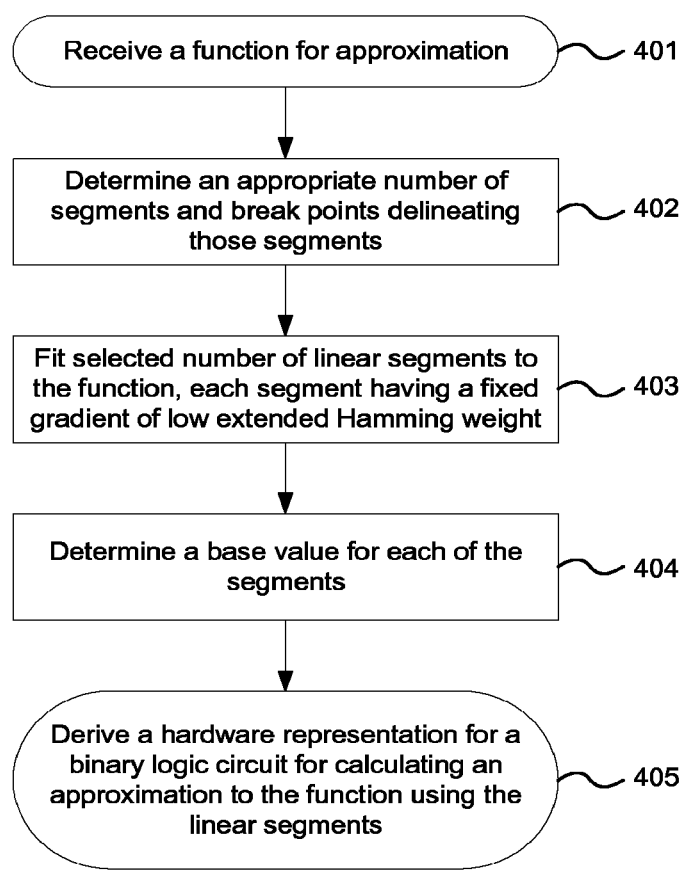
FIG. 4 is a flowchart illustrating a process for designing a binary logic circuit according to another aspect of the invention.

A process for designing a binary logic circuit (such as the circuit shown in FIG. 2) according to the principles described herein is illustrated by the flowchart of FIG. 4. On receiving a function for which an approximation is required 401 over some defined range of values, an appropriate number of linear segments and break points delineating those segments is chosen 402. This can be done with a view to providing an approximation of the desired accuracy given the extent of the predefined range over which the approximation is to be provided and the complexity of the function in that range—for example, a greater number of segments can be used in areas where the gradient of the function changes more quickly. For simple monotonic functions, such as log( ) curves, somewhere between two and five linear segments can provide a good approximation for many applications. The number and distribution of linear segments may be chosen, for example, through a process of trial and error, or using a computerised search based on a set of pre-computed low extended Hamming weight coefficients.

The selected number of linear segments having fixed gradients drawn from a set of gradient values having low extended Hamming weights are then fitted to the function at 403. One way of choosing appropriate gradients from a set of gradient values having low extended Hamming weights will now be described by way of example.
1. Determine the value of the function at the break points and the endpoints of the defined range over which the function is to be approximated.
2. Use the breakpoint and endpoint values to calculate the average gradient of the curve between adjacent end/break points (e.g. divide the difference between the values of the function at the adjacent end/break points by the difference between the corresponding x values).
3. For each respective pair of adjacent end/break points, select for use as the gradient of the respective linear segment a gradient from a set of gradient values having low extended Hamming weights, the selected gradient being close to (and preferably as close as possible to) the calculated average gradient.

Once the gradients of the linear segments have been chosen, a base value for each segment can be determined 404—for example, a value at which that linear segment crosses an axis. This can be achieved by selecting one or more reference points with respect to which the linear segments are fixed in the function space. Typically these might be the start and/or end points of the function over the defined range. For instance, in FIG. 2, the first segment 303 is selected to start at the point on the log function $x=1$, $\log(x)=0$ and the last segment 305 is selected to end at the point on the log function $x=2$, $\log(x)=1$. Fixing these points also fixes the central segment 304 which is joined end-to-end with the first and last segments. Each of the line segments can then be extrapolated back to an axis, for example, in order to determine a base value for use in hardware calculations in the manner described herein.

It will be appreciated that for each linear segment there is scope to choose a range of low extended Hamming weight gradient values and reference points with respect to which the segments are fixed. It can be advantageous to iterate steps 402-404 in FIG. 4 in order to determine an optimum approximation to the function at hand—for example, by making small changes to the break points, choice of low extended Hamming weight gradients and reference points in order to obtain a best fit between the line segments and the function. For example, such optimisation could be performed so as to minimise the total mean squared error of the approximations over the defined range.

This can help to deal with the case of monotonic increasing functions whose gradient reduces as x increases. For such functions, the choice of gradient determined according to the above example in which the start and end points lie on the function would typically mean that each linear segment largely lies slightly below the function. By performing an optimisation step so as to minimise the total mean squared error of the approximations over the defined range, a better fit can sometimes be determined—for example by choosing a slightly higher first slope, and slightly lower final slope so that each line segment has some sections that are below the curve, and others that are above. This can result in a lower mean squared error over the range.

The particular example shown in FIG. 3 will now be described in more detail. Three linear segments are used to approximate the $\log_2(x)$ function having endpoints and breakpoints at 1, 1.25, 1.5 and 2. The values of the $\log_2(x)$ function at those points, and the average gradient between those points on the curve representing the function are as shown in Table 2. From these average gradients, the closest low extended Hamming weight number is selected for use as the gradient of the respective linear segment. Thus, the first segment 303 between x values of 1 and 1.25 on the curve is chosen to have a gradient of 1.3125, the second segment 304 between x values of 1.25 and 1.5 on the curve is chosen to have a gradient of 1.0625, and the third segment 305 between x values of 1.5 and 2 on the curve is chosen to have a gradient of 0.8125, as is indicated in FIG. 3.

TABLE 2

| End point/ break point | Value of $\log_2(x)$ at that point | Average gradient between adjacent end/breakpoints on the curve | Closest low extended Hamming weight expression of gradient |
| --- | --- | --- | --- |
| 1 | 0 | 1.288 | 1.3125 |
| 1.25 | 0.3219 | 1.052 | 1.0625 |
| 1.5 | 0.5850 | 0.830 | 0.8125 |
| 2 | 1 | | |

Once the gradient and base value parameters of the linear segments of a given approximation to a function have been determined, a hardware representation of the approximation represented by the linear segments can be derived 405 using the lowest extended Hamming weight representation of the fixed gradient of each segment. Such a hardware representation could define a binary logic circuit according to the example shown in FIG. 2 and described above. A hardware representation could be derived as a logical representation of the hardware elements required to form a logic circuit for performing the approximation, e.g. at register-transfer level (RTL), or as any other suitable representation of a logic circuit.

A design process as set out in FIG. 4 and described herein could be implemented in software for designing a hardware representation of a binary logic circuit. For example, the process could be implemented in software for designing register-transfer level (RTL) definitions of integrated circuits. By following the principles described herein, such software can provide faster and more space-efficient hardware implementations of binary logic for calculating an approximation for a given function.

A binary circuit derived in accordance with the above principles could be manufactured according to any suitable fabrication process. For example, an integrated circuit in the form of a silicon semiconductor device can be manufactured according to a conventional set of processing steps which might involve deposition on a silicon wafer, followed by patterning and packaging a die as an integrated circuit.

Note an adder refers to logic for both addition and subtraction. Since addition of a negative number is equivalent to subtraction, the terms add, adder and addition all refer broadly to either addition of a positive number or subtraction of a positive number, as well as addition of a negative number or subtraction of a negative number.

The binary logic circuit of FIG. 2 is shown as comprising a number of functional blocks. This is schematic only and is not intended to define a strict division between different logic elements of an integrated circuit. Each functional block can be provided in any suitable manner.

The terms software and computer readable program code as used herein includes executable code for processors (e.g. CPUs and/or GPUs), firmware, bytecode, programming language code such as C or OpenCL, and modules for reconfigurable logic devices such as FPGAs. Machine-readable code includes software and code for defining hardware representations of integrated circuits at any level, including at register transfer level (RTL), at high-level circuit representations such as Verilog or VHDL, and lower-level representations such as OASIS and GDSII.

The algorithms and methods described herein could be performed by one or more physical processing units executing software that causes the unit(s) to perform the algorithms/methods. The or each physical processing unit could be any suitable processor, such as a CPU or GPU (or a core thereof), or fixed function or programmable hardware. The software could be stored in non-transitory form at a machine readable medium such as an integrated circuit memory, or optical or magnetic storage. A machine readable medium might comprise several memories, such as on-chip memories, computer working memories, and non-volatile storage devices.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein, and without limitation to the scope of the claims. The applicant indicates that aspects of the present invention may consist of any such individual feature or combination of features. In view of the foregoing description it will be evident to a person skilled in the art that various modifications may be made within the scope of the invention.

What is claimed is:

1. A binary logic circuit for approximating a mathematical function over a predefined range as a series of linear segments, each linear segment having a gradient and a base value, the binary logic circuit comprising:
   an input for receiving an input variable in the predefined range;
   a plurality of logic chains each comprising:
      a binary multiplier configured to perform multiplication by a gradient, and
      a binary adder configured to add a base value to an input or output of the binary multiplier; and
   selection logic configured to select one of the logic chains in dependence on the input variable so as to provide, for the received input variable, an approximate value of the mathematical function,
   wherein each of the gradients has a minimum extended Hamming weight which is less than or equal to a threshold value.

2. The binary logic circuit of claim 1, wherein each linear segment has one of a predetermined set of fixed gradients, and wherein each of the fixed gradients in the predetermined set of fixed gradients has a respective minimum extended Hamming weight which is less than or equal to the threshold value.

3. The binary logic circuit of claim 2, wherein the extended minimum Hamming weights of the respective fixed gradients of the predetermined set are less than or equal to 3.

4. The binary logic circuit of claim 1, wherein the binary multiplier is configured to perform multiplication by a gradient using a number of binary adders, wherein said number of binary adders is one less than the minimum extended Hamming weight for the respective gradient.

5. The binary logic circuit of claim 1, wherein the threshold value is 2 or 3.

6. The binary logic circuit of claim 1, wherein each linear segment extends between a pair of break points, and wherein the selection logic is configured to select one of the logic chains by comparing the received input variable to a predetermined set of break values associated with the break points, each break value representing a value of the input variable delimiting one or more linear segments.

7. The binary logic circuit of claim 6, the selection logic being configured to determine the pair of adjacent break values between which the received input variable lies and, responsive to that determination, select the logic chain corresponding to the linear segment lying between that pair of adjacent break values.

8. The binary logic circuit of claim 6, wherein each of the break values has a minimum extended Hamming weight which is less than or equal to a further threshold value, and wherein each of the set of break values is used in the selection logic in the form of a representation of that break value having a minimum extended Hamming weight for that break value.

9. The binary logic circuit of claim 8, wherein the minimum extended Hamming weight of each of the set of break values is less than or equal to 3.

10. The binary logic circuit of claim 1, wherein the mathematical function is expressed in the form y=f(x), where x and y represent values along respective Cartesian axes, and wherein the binary adder of each logic chain is arranged to add the respective base value to the output of the binary multiplier.

11. The binary logic circuit of claim 10, wherein each linear segment represents part of a line that crosses the y axis at the base value.

12. The binary logic circuit of claim 1, wherein the mathematical function is expressed in the form y=f(x), where x and y represent values along respective Cartesian axes, and wherein the binary adder of each logic chain is arranged to add the respective base value to the received input variable.

13. The binary logic circuit of claim 12, wherein each linear segment represents part of a line that crosses the x axis at the base value.

14. The binary logic circuit of claim 1, wherein the mathematical function is a continuous smooth function over the predefined range, or wherein the mathematical function is a base 2 logarithm and the predefined range is between 1 and 2, or wherein the mathematical function is a gamma function and the predefined range is between 0 and 1.

15. The binary logic circuit of claim 1, wherein at least one of the plurality of logic chains comprises a binary multiplier configured to perform multiplication by a fixed gradient having a minimum extended Hamming weight of greater than one.

16. A method of deriving a hardware representation of a binary logic circuit configured to approximate a mathematical function over a predefined range as a series of linear segments, the method comprising:
fitting a plurality of linear segments to the function over the predefined range, each linear segment having a gradient and a base value; and
deriving a hardware representation for a binary logic circuit which comprises
for each of the plurality of linear segments:
a binary multiplier configured to perform multiplication by the gradient of the segment, and
a binary adder configured to add the base value for the segment to an input or output of the binary multiplier; and
selection logic configured to select, for a given input variable in the predefined range, one of the plurality of binary multipliers;
wherein each of the gradients has a minimum extended Hamming weight which is less than or equal to a threshold value.

17. The method of claim 16, wherein each of the linear segments has one of a predetermined set of fixed gradients, and wherein each of the fixed gradients in the predetermined set of fixed gradients has a minimum extended Hamming weight which is less than or equal to the threshold value, and
wherein the binary multiplier is configured to perform multiplication by a respective fixed gradient of the set of fixed gradients using a number of binary adders, wherein said number of binary adders is one less than the minimum extended Hamming weight for the selected fixed gradient.

18. The method of claim 17, further comprising:
for each of the plurality of linear segments, calculating an average gradient between break points delineating that linear segment; and
selecting the closest fixed gradient to the calculated average gradient from the predetermined set of fixed gradients.

19. The method of claim 16, further comprising selecting a sufficient number of the plurality of linear segments such that the binary logic circuit achieves at least a predetermined accuracy substantially over the predefined range of values for the input variable.

20. A method of manufacturing a binary logic circuit in accordance with a hardware representation derived using an approximation of a mathematical function over a predefined range as a series of linear segments, comprising the steps of:
fitting a plurality of linear segments to the function over the predefined range, each linear segment having a gradient and a base value; and
deriving a hardware representation for a binary logic circuit which comprises:
for each of the plurality of linear segments:
a binary multiplier configured to perform multiplication by the gradient of the segment, and
a binary adder configured to add the base value for the segment to an input or output of the binary multiplier; and
selection logic configured to select, for a given input variable in the predefined range, one of the plurality of binary multipliers;
wherein each of the gradients has a minimum extended Hamming weight which is less than or equal to a threshold value.

* * * * *